United States Patent
Zhong et al.

(10) Patent No.: US 11,170,287 B2
(45) Date of Patent: Nov. 9, 2021

(54) GENERATING DUAL SEQUENCE INFERENCES USING A NEURAL NETWORK MODEL

(71) Applicant: salesforce.com, inc., San Francisco, CA (US)

(72) Inventors: Victor Zhong, Palo Alto, CA (US); Caiming Xiong, Mountain View, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 917 days.

(21) Appl. No.: 15/881,582

(22) Filed: Jan. 26, 2018

(65) Prior Publication Data
US 2019/0130248 A1    May 2, 2019

Related U.S. Application Data

(60) Provisional application No. 62/578,380, filed on Oct. 27, 2017.

(51) Int. Cl.
*G06N 3/04*    (2006.01)
*G06N 3/08*    (2006.01)
(Continued)

(52) U.S. Cl.
CPC ........... *G06N 3/04* (2013.01); *G06F 16/2462* (2019.01); *G06F 16/93* (2019.01); *G06N 3/006* (2013.01);
(Continued)

(58) Field of Classification Search
CPC ........ G06N 3/04; G06N 3/006; G06N 3/0454; G06N 3/0445; G06N 3/08; G06N 5/04; G06N 3/0481; G06F 16/93; G06F 16/2462
See application file for complete search history.

(56) References Cited

U.S. PATENT DOCUMENTS

| 8,121,367 B2 | 2/2012 | Socher et al. |
| 8,355,550 B2 | 1/2013 | Zhang et al. |

(Continued)

OTHER PUBLICATIONS

Wenhui Wang, Nan Yang, Furu Wei, Baobao Chang, and Ming Zhou. 2017. Gated self-matching networks for reading comprehension and question answering. In ACL. (Year: 2017).*

(Continued)

*Primary Examiner* — Paulinho E Smith
(74) *Attorney, Agent, or Firm* — Haynes and Boone, LLP (57) ABSTRACT

A computer-implemented method for dual sequence inference using a neural network model includes generating a codependent representation based on a first input representation of a first sequence and a second input representation of a second sequence using an encoder of the neural network model and generating an inference based on the codependent representation using a decoder of the neural network model. The neural network model includes a plurality of model parameters learned according to a machine learning process. The encoder includes a plurality of coattention layers arranged sequentially, each coattention layer being configured to receive a pair of layer input representations and generate one or more summary representations, and an output layer configured to receive the one or more summary representations from a last layer among the plurality of coattention layers and generate the codependent representation.

20 Claims, 8 Drawing Sheets

(51) Int. Cl.
   *G06N 5/04* (2006.01)
   *G06F 16/93* (2019.01)
   *G06F 16/2458* (2019.01)
   *G06N 3/00* (2006.01)

(52) U.S. Cl.
   CPC ......... *G06N 3/0445* (2013.01); *G06N 3/0454* (2013.01); *G06N 3/08* (2013.01); *G06N 5/04* (2013.01); *G06N 3/0481* (2013.01)

(56) References Cited

U.S. PATENT DOCUMENTS

| | | | | |
|---|---|---|---|---|
| 8,880,388 | B2* | 11/2014 | Ferrucci | G06F 16/90332 704/7 |
| 10,282,663 | B2 | 5/2019 | Socher et al. | |
| 10,346,721 | B2 | 7/2019 | Albright et al. | |
| 2016/0125291 | A1* | 5/2016 | Eggebraaten | G06F 16/24578 706/50 |
| 2016/0350653 | A1 | 12/2016 | Socher et al. | |
| 2017/0024645 | A1 | 1/2017 | Socher et al. | |
| 2017/0032280 | A1 | 2/2017 | Socher et al. | |
| 2017/0140240 | A1 | 5/2017 | Socher et al. | |
| 2018/0082171 | A1 | 3/2018 | Merity et al. | |
| 2018/0096219 | A1 | 4/2018 | Socher | |
| 2018/0096267 | A1 | 4/2018 | Masekara et al. | |
| 2018/0121787 | A1 | 5/2018 | Hashimoto et al. | |
| 2018/0121788 | A1 | 5/2018 | Hashimoto et al. | |
| 2018/0121799 | A1 | 5/2018 | Hashimoto et al. | |
| 2018/0129931 | A1 | 5/2018 | Bradbury et al. | |
| 2018/0129937 | A1 | 5/2018 | Bradbury et al. | |
| 2018/0129938 | A1 | 5/2018 | Xiong et al. | |
| 2018/0143966 | A1 | 5/2018 | Lu et al. | |
| 2018/0144208 | A1 | 5/2018 | Lu et al. | |
| 2018/0144248 | A1 | 5/2018 | Lu et al. | |
| 2018/0268287 | A1 | 9/2018 | Johansen et al. | |
| 2018/0268298 | A1 | 9/2018 | Johansen et al. | |
| 2018/0300400 | A1 | 10/2018 | Paulus | |
| 2019/0108432 | A1 | 4/2019 | Lu et al. | |
| 2019/0108439 | A1 | 4/2019 | Lu et al. | |
| 2019/0130896 | A1 | 5/2019 | Zhou et al. | |
| 2019/0130897 | A1 | 5/2019 | Zhou et al. | |
| 2019/0149834 | A1 | 5/2019 | Zhou et al. | |

OTHER PUBLICATIONS

Buck, C., J. Bulian, M. Ciaramita, A. Gesmundo, N. Houlsby, W. Gajewski, and W. Wang. 2017. "Ask the right questions: Active question reformulation with reinforcement learning". arXiv preprint arXiv:1705.07830v1 (Year: 2017).*
Weston, J. E. Dialog-based language learning. In Advances in Neural Information Processing Systems, pp. 829-837, 2016. (Year: 2016).*
Lu, J.; Yang, J.; Batra, D.; and Parikh, D. 2016. Hierarchical question-image co-attention for visual question answering. In NIPS (Year: 2016).*
Dzmitry Bahdanau, Kyunghyun Cho, and Yoshua Bengio. Neural machine translation by jointly learning to align and translate. In ICLR, 2015.
Dzmirry Bahdanau. Philemon BrakEL, Kelvin Xu, Anirudh Goyal, Ryan Lowe, Joelle Pineau, Aaron C. Courville, and Yoshua Bengio. An actor-critic algorithm for sequence prediction. Ln ICLR, 2017.
Danqi Chen, Adam Fisch, Jason Weston, and Antoine Bordes. Reading Wikipedia to answer open-domain questions. In ACL, 2017.
Nina Dethlefs and Heriberto Cuayahuitl. Combining hierarchical reinforcement learning and bayesian networks. For natural language generation in situated dialogue. In Proceedings of the 13th European Workshop on Natural Language Generation, pp. 110-120. Association for Computational Linguistics, 2011.
Evan Greensmith. Peter L. Bartlett, and Jonathan Baxter. Variance reduction techniques for gradient estimates in reinforcement learning. Journal of Machine Learning Research, 5:14 71-1530. 2001.

Kazuma Hashimoto, Caiming Xiong. Yoshimasa Tsuruoka, and Richard Socher. A joint many-task model:. Growing a neural network for multiple NLP tasks. In EMNLP, 2017.
Kaiming He. Xiangyu ZHang, Shaoqing Ren, and Jian Sun. Deep residual learning for image recognition. 2016 IEEE Conference on Computer Vision and Pattern Recognition (CVPR), pp. 770-778, 2016.
Sepp Hochreiter and Jurgen Schmidhuber. Long short-term memory. Neural computation, 9 8:1735-80, 1997.
Alex Kendall, Yarin Gal. and Roberto Cipolla. Multi-task learning using uncertainty to weigh losses for scene geometry and semantics. CoRR. abs/1705.07115, 2017.
Diederik P. Kingma and Jimmy Ba. Adam: A method for stochastic optimization. CoRR, abs/1412.6980, 2014.
Vijay R Konda and John N. Tsitsiklis. Actor-critic algorithms. In NIPS, 1999.
Jiwei Li, Will Monroe, Alan Ritter. Michel Galley, Jianfeng Gao, and Dan Jurafsky. Deep reinforcement learning for dialogue generation. In EMNLP. 2016.
Rui Liu, Junjie Hu. Wei Wei, Zi Yang, and Eric Nyberg. Structural embedding of syntactic trees for machine comprehension. In ACL, 2017.
Jiasen Lu, Jianwei Yang, Dhruv Batra, and Devi Parikh. Hierarchical question-image co-attention for visual question answering. In NIPS, 2016.
Christopher D. Manning, Mihai Surdeanu, John Bauer. Jenny Rose Finkel, Steven Bethard, and David McClosky. The stanford corenlp natural language processing toolkit. In ACL, 2014.
Bryan McCann, James Bradbury. Caiming Xiong, and Richard Socher. Learned in translation: Contextualized word vectors. In NIPS. 2017.
Microsoft Asia Natural Language Computing Group. R-net: Machine reading comprehension with self-matching networks. 2017.
Karthik Narasimhan, Tejas D. Kulkarni, and Regina Barzilay. Language understanding for text-based games using deep reinforcement learning. In EMNLP, 2015.
Romain Paulus, Caiming Xiong, and Richard Socher. A deep reinforced model for abstractive summarizarion. CoRR, abs/1705. 04304, 2017.
Jeffrey Pennington, Richard Socher, and Christopher D. Manning. Glove: Global vectors for word representation. In EMNLP, 2014.
Pranav Rajpurkar. Jian Zhang. Konstantin Lopyrev, and Percy Liang. Squad: 100, 000+ questions for machine comprehension of text. In EMNLP, 20 I 6.
John Schulman, Nicolas Heess, Theophane Weber, and Pieter Abbeel. Gradient estimation using stochastic computation graphs. In NIPS, 2015.
Min Joon Seo, Aniruddha Kembbavi, Ali Farhadi, and Hannaneb Hajishirzi. Bidirectional attention flow for machine comprehension. In ICLR, 2017.
Noam Sbazeer, Azalia Mirhoseini, Krzysztof Mazi;irz, Andy Davis. Quoc Le, Geoffrey Hinton, and Jeff Dean. Outrageously large neural networks: The sparsely-gated mixture-of-experts layer. In ICLR. 2017.
Yelong Shen, Po-Sen Huang. Jianfeng Gao, and Weizhu Chen. Reasonet: Learning to stop reading in machine comprehension. In Proceedings of the 23rd ACM SIGKDD international Conference on Knowledge Discovery and Data Mining, pp. 1047-1055. ACM, 2017.
Richard S. Sutton, David A. McAllester, Satinder P. Singh, and Yishay Mansour. Policy gradient methods for reinforcement learning with function approximation. In NIPS, I 999.
Ashish Vaswani, Noam Shazeer, Niki Parmar, Jakob Uszkoreit, Llion Jones, Aidan N. Gomez, Lukasz Kaiser. and Illia Polosukhin. Attention is all you need. In NIPS, 2017.
Oriol Vinyals, Meire Fortunato, and Navdeep Jaitly. Pointer networks. In NIPS, 2015.
Shuohang Wang and Jing Jiang. Machine comprehension using match-lstm and answer pointer. In ICLR. 2017.
Dirk Weissenborn, Georg Wiese, and Laura Seiffe. Making neural qa as simple as possible but not simpler. In CoNLL, 2017.
Yonghui Wu, Mike Schuster, Zhifeng Chen, Quoc V Le, Mohammad Norouzi, Wolfgang Macherey, Maxim KrikuN, Yuan Cao. Qin (56) References Cited

OTHER PUBLICATIONS

Gao, Klaus Macherey, et al. Google's neural machine translation system: Bridging the gap between human and machine translation. arXiv preprinit arXiv: 1609.08144, 2016.

Caiming Xiong, Victor Zhong, and Richard Socher. Dynamic coattention networks for question answering. In *ICLR*. 2017.

Gong et al., "Ruminating Reader: Reasoning with Gated Multi-Hop Attention," Proceedings of the Workshop on Machine Reading for Question Answering. Melbourne, Australia. Jul. 19, 2018. pp. 1-11.

Gu et al., "Stack-Captioning: Coarse-to-Fine Learning for Image Captioning," 32nd AAAI Conference on Artificial Intelligence. New Orleans, Louisiana. Feb. 2-7, 2018. pp. 1-8.

Hu et al., "Reinforced Mnemonic Reader for Machine Reading Comprehension," International Joint Conference on Artificial Intelligence. Stockholm, Sweden. Jul. 13-19, 2018. pp. 1-8.

Liu et al., "Recognizing Implicit Discourse Relations via Repeated Reading: Neural Networks with Multi-Level Attention," Conference on Empirical Methods in Natural Language Processing. Austin, Texas. Nov. 1-5, 2016. pp. 1-10.

Xiong et al., "DCN+: Mixed Objective and Deep Residual Coattention for Question Answering," International Conference on Learning Representation. Vancouver, Canada. Apr. 30-May 3, 2018. pp. 1-10.

Zhang et al., "Two-Step Joint Attention Network for Visual Question Answering," 3rd International Conference on Big Data Computing and Communications. Yonago, Japan. Jul. 10-12, 2018. pp. 1-8.

International Search Report and Written Opinion issued by the International Searching Authority on Jan. 30, 2019 for PCT Application No. PCT/US2018/056493. pp. 1-18.

\* cited by examiner

| Model | Dev EM | Dev F1 | Test EM | Test F1 | Ens Test EM | Ens Test F1 |
|---|---|---|---|---|---|---|
| DCN+ | 74.5% | 83.1% | 75.1% | 83.1% | 78.9% | 86.0% |
| rnet | 71.3% | 80.6% | 72.3% | 80.7% | 76.9% | 84.0% |
| SEDT | 67.9% | 77.4% | 68.5% | 78.0% | 73.0% | 80.8% |
| BiDAF | 67.7% | 77.3% | 68.0% | 77.3% | 73.3% | 81.5% |
| Mnemonic Reader | 70.1% | 79.6% | 69.9% | 79.2% | 73.7% | 81.7% |
| DCN w/ CoVe | 71.3% | 79.9% | – | – | – | – |
| ReasoNet | – | – | 69.1% | 78.9% | 73.4% | 81.8% |
| Document Reader | 69.5% | 78.8% | 70.0% | 79.0% | – | – |
| FastQA | 70.3% | 78.5% | 70.8% | 78.9% | – | – |
| DCN | 65.4% | 75.6% | 66.2% | 75.9% | 71.6% | 80.4% |

| Model | Dev EM | Δ EM | Dev F1 | Δ F1 |
|---|---|---|---|---|
| DCN+ | 74.5% | | 83.1% | |
| - Deep residual coattention | 73.1% | 1.4% | 81.5% | 1.6% |
| - Mixed objective | 73.8% | 0.7% | 82.1% | 1.0% |

GENERATING DUAL SEQUENCE INFERENCES USING A NEURAL NETWORK MODEL

RELATED APPLICATIONS

The present application claims priority to U.S. Provisional Patent Application No. 62/578,380, filed Oct. 27, 2017, entitled "DCN+: Mixed Objective and Deep Residual Coattention for Question Answering," which is hereby incorporated by reference in its entirety.

TECHNICAL FIELD

Embodiments of the present disclosure relate generally to neural network models and more particularly to neural network models for dual sequence inference.

BACKGROUND

Neural networks have demonstrated great promise as a technique for automatically analyzing real-world information with human-like accuracy. In general, neural network models receive input information and make predictions based on the input information. For example, a neural network classifier may predict a class of the input information among a predetermined set of classes. Whereas other approaches to analyzing real-world information may involve hard coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications. Indeed, some applications have even been identified in which neural networking models exceed human-level performance.

DETAILED DESCRIPTION

Question answering (QA) is one class of problems to which neural networks may be been applied. In QA applications, a QA model receives a sequence of text representing a document and a sequence of text representing a question. The goal of the QA model is to accurately predict a portion of the document (e.g., a span of text in the document) that answers the question. To illustrate, suppose a document provided to a QA model includes the text "Some believe that the Golden State Warriors team of 2017 is one of the greatest teams in NBA history," and further suppose that a question provided to the QA model includes the text "Which team is considered to be one of the greatest teams in NBA history?" The ground truth answer to the question is the span of text in the document that reads "the Golden State Warriors team of 2017." Accordingly, the QA model should identify the span of text in the document that matches the ground truth answer. At the very least, the QA model should identify an overlapping span of text that is close in meaning to the ground truth answer (e.g., "Golden State Warriors").

QA models are applicable to a variety of technologies, including search engines, digital personal assistants, chatbots, and/or the like. Some QA models may be designed for general-purpose applications (e.g., capable of answering a wide variety of question and/or document types, question and/or document lengths, answer lengths, and/or the like). Others may be tailored for specialized applications.

The performance of QA models may be compared or benchmarked by testing different models on a shared dataset, such as, for example, the Stanford Question Answering Dataset (SQuAD). The accuracy of each model may be measured by evaluating one or more metrics, such as exact match accuracy (e.g., the percentage of trials where the predicted answer exactly matches the ground truth answer), F1 score accuracy (which assesses the amount of overlap between the predicted answer and the ground truth answer), and/or the like. State of art QA models achieve less than or equal to 72.3% exact match accuracy and less than or equal to 80.7% F1 score accuracy on SQuAD, or when ensembled, less than or equal to 76.9% exact match accuracy and less than or equal to 84.0% F1 score accuracy.

Accordingly, it is desirable to develop QA models that achieve higher accuracy than current state of art QA models. It is also desirable to develop techniques for training QA models faster and/or with less training data. More generally, it is desirable to developed improved neural network models that generate inferences based on a pair of input sequences, referred to herein as dual sequence inference. Although some dual sequence inference models receive text input sequences, such as the QA models described above, it is to be understood that the dual sequence inference models may operate on a wide variety of types of input sequences, including but not limited to text sequences, audio sequences, image sequences (e.g., video), and/or the like.

Figure 1:
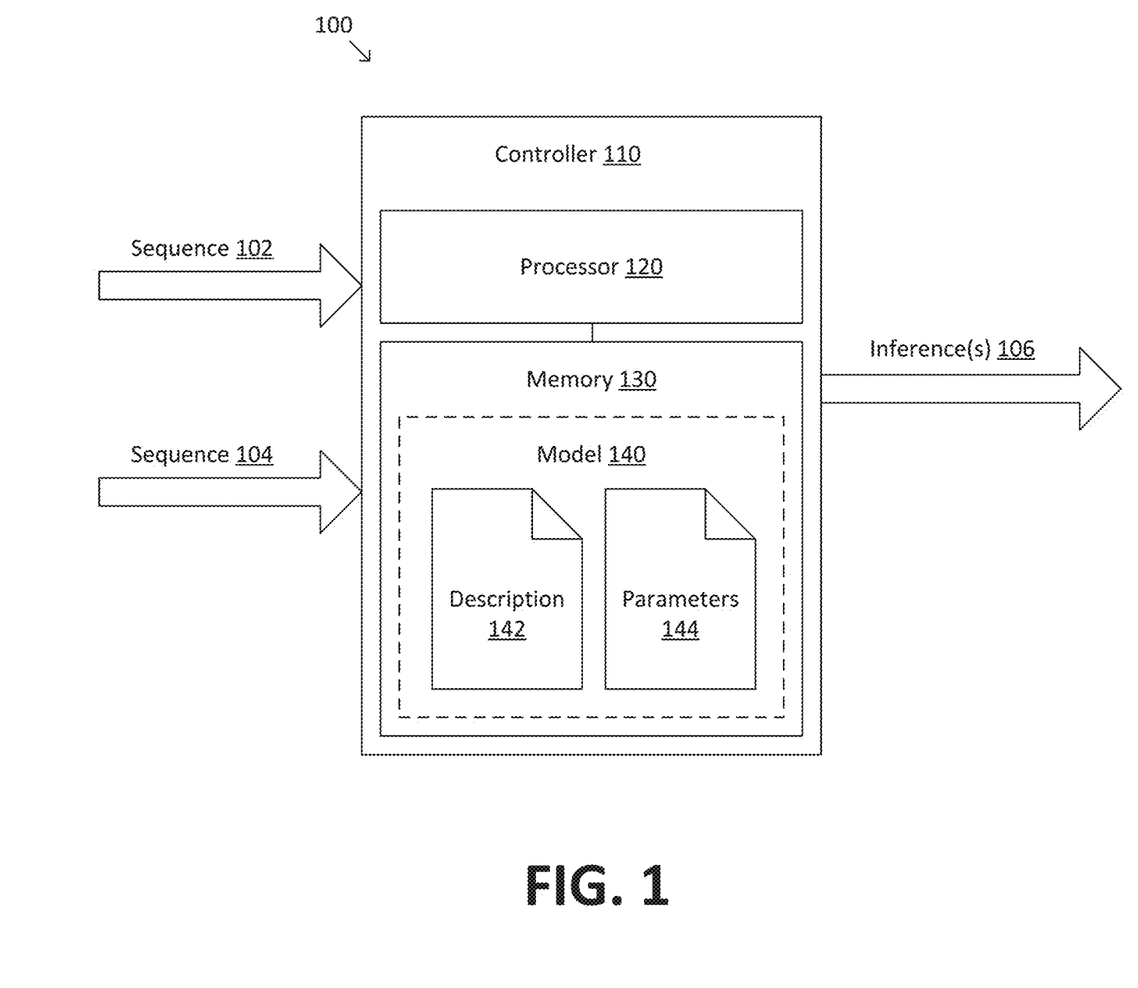
FIG. 1 is a simplified diagram of a system for dual sequence inference according to some embodiments.

FIG. 1 is a simplified diagram of a system 100 for dual sequence inference according to some embodiments. According to some embodiments, system 100 may receive a first sequence 102 and a second sequence 104 and generate an inference 106 (and/or multiple inferences). In QA applications, sequence 102 may correspond to a text sequence representing a document, sequence 104 may correspond to a text sequence representing a question, and inference 106 may correspond to a span of text in the document representing an answer to the question. However, it is to be understood that QA is merely one example, and that system 100 may be used in a wide variety of applications, including non-QA applications such as textual entailment (TE) applications.

As depicted in FIG. 1, system 100 includes a controller 110. In some embodiments, controller 110 may include a processor 120 (e.g., one or more hardware processors). Although processor 120 may include one or more general purpose central processing units (CPUs), processor 120 may additionally or alternately include at least one processor that provides accelerated performance when evaluating neural network models. For example, processor 120 may include a graphics processing unit (GPU), an application specific integrated circuit (ASIC), a field programmable gate array (FPGA), a tensor processing unit (TPU), a digital signal processor (DSP), a single-instruction multiple-data (SIMD) processor, and/or the like. Generally, such processors may accelerate various computing tasks associated with evaluating neural network models (e.g., training, prediction, pre-processing, and/or the like) by an order of magnitude or more in comparison to a general purpose CPU.

Controller 110 may further include a memory 130 (e.g., one or more non-transitory memories). Memory 130 may include various types of short-term and/or long-term storage modules including cache memory, static random access memory (SRAM), dynamic random access memory (DRAM), non-volatile memory (NVM), flash memory, solid state drives (SSD), hard disk drives (HDD), optical storage media, magnetic tape, and/or the like. In some embodiments, memory 130 may store instructions that are executable by processor 120 to cause processor 120 to perform operations corresponding to processes disclosed herein and described in more detail below.

Processor 120 and/or memory 130 may be arranged in any suitable physical arrangement. In some embodiments, processor 120 and/or memory 130 may be implemented on a same board, in a same package (e.g., system-in-package), on a same chip (e.g., system-on-chip), and/or the like. In some embodiments, processor 120 and/or memory 130 may include distributed, virtualized, and/or containerized computing resources. Consistent with such embodiments, processor 120 and/or memory 130 may be located in one or more data centers and/or cloud computing facilities.

In some embodiments, memory 130 may store a model 140 that is evaluated by processor 120 during dual sequence inference. Model 140 may include a plurality of neural network layers. Examples of neural network layers include densely connected layers, convolutional layers, recurrent layers, pooling layers, dropout layers, and/or the like. In some embodiments, model 140 may include at least one hidden layer that is not directly connected to either an input or an output of the neural network. Model 140 may further include a plurality of model parameters (e.g., weights and/or biases) that are learned according to a machine learning process. Examples of machine learning processes include supervised learning, reinforcement learning, unsupervised learning, and/or the like. Embodiments of model 140 are described in further detail below with reference to FIGS. 2-7.

Model 140 may be stored in memory 130 using any number of files and/or data structures. As depicted in FIG. 1, model 140 includes a model description file 142 that defines a computational graph of model 140 (e.g., a sequence of neural network layers) and a model parameters file 144 that stores parameters of model 140 (e.g., weights and/or biases). In general, model description file 142 and/or model parameters file 144 may be store information associated with model 140 in any suitable format, including but not limited to structured, unstructured, serialized, and/or database formats.

Figure 2:
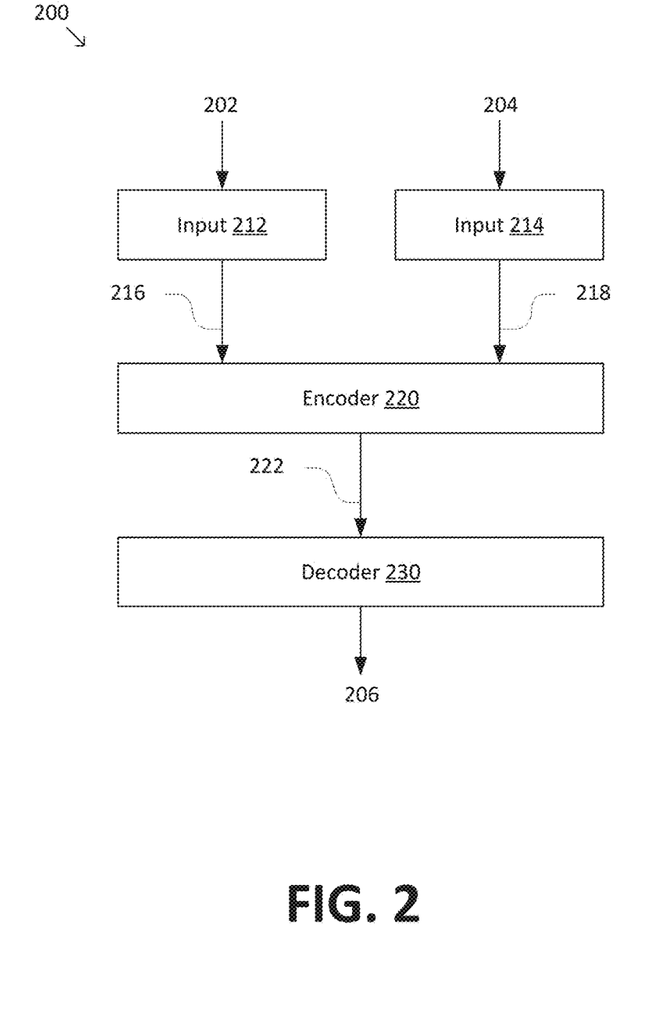
FIG. 2 is a simplified diagram of a model for dual sequence inference according to some embodiments.

FIG. 2 is a simplified diagram of a model 200 for dual sequence inference according to some embodiments. According to some embodiments consistent with FIG. 1, model 200 may be used to implement model 140. In some embodiments, model 200 may receive a first sequence 202 and a second sequence 204 and generate an inference 206 (and/or multiple inferences). In embodiments consistent with FIG. 1, sequences 202 and 204 and inference 206 may generally correspond to sequences 102 and 104 and inference 106, respectively.

Model 200 may include a first input stage 212 and a second input stage 214 that receive sequences 202 and 204, respectively. Input stage 212 generates an input representation 216 of sequence 202, and input stage 214 generates an input representation 218 of sequence 204. In some embodiments, input representations 216 and/or 218 may correspond to vector representations of sequences 202 and/or 204, respectively. For example, when sequences 202 and/or 204 correspond to text sequences, input stages 212 and/or 214 may generate the corresponding vector representations by (1) tokenizing the text sequences and (2) embedding the tokenized text sequences in a vector space. Tokenizing the text sequences may include identifying tokens within the text sequences, where examples of tokens include characters, character n-grams, words, word n-grams, lemmas, phrases (e.g., noun phrases), sentences, paragraphs, and/or the like. Embedding the tokenized text sequences may include mapping each token to a vector representation in a multidimensional vector space. For example, a token corresponding to a word may be mapped to a 300-dimensional vector representation of the word using pre-trained GloVe vectors.

Model 200 may further include an encoder stage 220 that receives input representations 216 and 218 and generates a codependent representation 222 of sequences 202 and/or 204 that depends on each of sequences 202 and 204. For example, in QA applications, where sequence 202 corresponds to a document and sequence 204 corresponds to a question, codependent representation 222 may depend on both the document and the question. This is in contrast to input stages 212 and 214, which analyze the document and the question independently of one another. In this regard, encoder stage 220 may harness the context that the question provides when analyzing the document and/or vice versa. In some embodiments, encoder stage 220 may include a deep coattention encoder, embodiments of which are described in greater detail below with reference to FIGS. 3-4.

Model 200 may further include a decoder stage 230 that receives codependent representation 222 and generates inference 206. In QA applications, decoder stage 230 may include a dynamic decoder that iteratively predicts a span in sequence 202 that contains the answer to the question corresponding to second sequence 204. For example, the dynamic decoder may output a pair of pointers corresponding to the start and end of the predicted span. The iterative process may terminate when the prediction converges (e.g., when a change in the prediction between consecutive iterations is below a threshold). Embodiments of dynamic decoders are described in further detail in "Dynamic Coattention Networks for Question Answering," in *ICLR*, 2017, to Xiong et al., which is herein incorporated by reference in its entirety.

According to some embodiments, model 200 may correspond to a computational graph, in which case input stages 212 and/or 214, encoder stage 220, and/or decoder stage 230 may correspond to collections of nodes in the computational graph. Consistent with such embodiments, various representations used by model 200, such as input representations 216 and/or 218, codependent representation 222, and/or any intermediate representations used by model 200, may correspond to real-valued tensors (e.g., scalars, vectors, multi-dimensional arrays, and/or the like) that are passed along edges of the computational graph. Moreover, each node of the computation graph may perform one or more tensor operations, e.g., transforming one or more input representations of the node into one or more output representations of the node. Examples of tensor operations performed at various nodes may include matrix multiplication, n-dimensional convolution, normalization, element-wise operations, and/or the like.

Figure 3A:
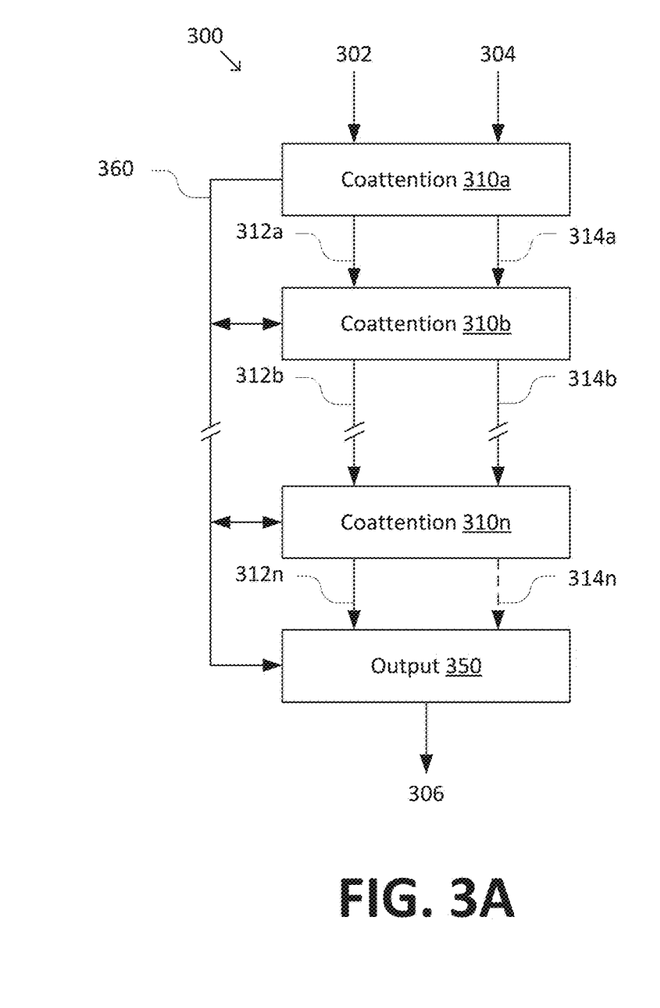
FIGS. 3A and 3B are simplified diagrams of a deep coattention encoder according to some embodiments.
Figure 3B:
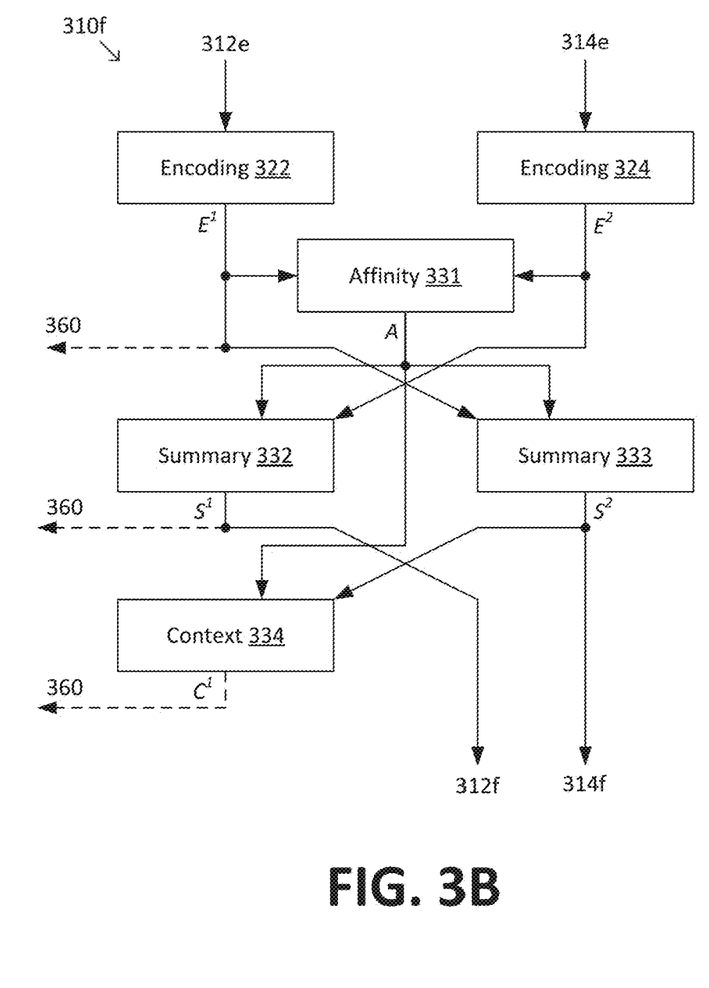

FIGS. 3A and 3B are simplified diagrams of a deep coattention encoder 300 according to some embodiments. According to some embodiments consistent with FIGS. 1-2, deep coattention encoder 300 may be used to implement encoder stage 220. Consistent with such embodiments, deep coattention encoder 300 may receive an input representation 302 of a first sequence and an input representation 304 of a second sequence and may generate a codependent representation 306 that depends on each of the first and second sequences. In some embodiments, input representations 302 and/or 304 may be generated by respective input stages, such as input stages 212 and/or 214.

Deep coattention encoder 300 may include a plurality of coattention layers 310a-n arranged sequentially (e.g., in a pipelined fashion). Each of coattention layer 310a-n generates a respective first summary representation 312a-n corresponding to the first sequence and a respective second summary representation 314a-n corresponding to the second sequence based on a pair of layer input representations. In the case of the first layer in the sequence (i.e., coattention layer 310a), the pair of layer input representations corresponds to input representations 302 and 304. In the case of other layers in the sequence (i.e., coattention layers 310b-n), the pair of layer input representations corresponds to summary representations 312a-n and 314a-n generated by a preceding layer in the sequence. In the case of the last layer in the sequence (i.e., coattention layer 310n), either of summary representations 312n and/or 314n may be omitted and/or optional. For example, as depicted in FIG. 3A, summary representation 314n is optional.

In comparison to encoders that include a single coattention layer, deep coattention encoder 300 may be capable of generating a richer codependent representation 306 that contains more relevant information associated with the first and second input sequences. For example, deep coattention encoder 300 may include more trainable model parameters than single-layer coattention encoders. Moreover, whereas a single-layer coattention encoder may allow each sequence to attend to the other sequence, deep coattention encoder 300 may allow each sequence to attend to itself as well as to the other sequence. Consequently, deep coattention encoder 300 may be capable of achieving higher accuracy than single-layer coattention encoders in dual sequence inference problems, such as QA problems.

FIG. 3B depicts a coattention layer 310f, which may be used to implement one or more of coattention layers 310a-n depicted in FIG. 3A. As depicted in FIG. 3B, coattention layer 310f includes a pair of encoding sub-layers 322 and 324 that each receive a respective layer input representation 312e and 314e and generate a respective encoded representation $E^1$ and $E^2$. In some embodiments, encoding sub-layers 322 and/or 324 may include one or more recurrent neural network (RNN) layers. In general, an RNN layer injects sequence-related information (e.g., temporal information) into the transformed representation. For example, the RNN layer may include a sequence of simple RNN cells, long short-term memory (LSTM) cells, gated recurrent units (GRUs), and/or the like. In some examples, the RNN layer may be bi-directional, e.g., a bi-directional LSTM (Bi-LSTM) layer. Additionally or alternately, encoding sub-layers 322 and/or 324 may include a feed-forward neural network layer, and/or may perform any other suitable transformation or set of transformation on layer input representations 312e and 314e. In some embodiments, encoding sub-layers 322 and/or 324 may include one or more non-linear activation functions (e.g., rectified linear units (ReLU), sigmoid, hypertangent (tanh), softmax, and/or the like).

In illustrative embodiments, encoded representations $E^1$ and $E^2$ may correspond to real-valued tensors determined according to the following equations:

$$E^1 = \text{encoding}^1(L^1) \in \mathbb{R}^{h \times m} \quad (1)$$

$$E^2 = \text{encoding}^2(L^2) \in \mathbb{R}^{h \times n} \quad (2)$$

where $L^1$ and $L^2$ denote the respective layer input representations; m and n denote the length of the first and second sequences, respectively; h denotes the number of dimensions of the encoded representations; and $\text{encoding}^1(X)$ and $\text{encoding}^2(X)$ denote respective encoding operations (e.g., RNN operations, bi-LSTM operations, feed-forward operations, and/or the like) applied to an input X.

Coattention layer 310f may further include an affinity node 331 that determines a set of affinity scores corresponding to each pair of items in in encoded representations $E^1$ and $E^2$. In general, an affinity score may be large for a related pair of items and small for an unrelated pair of items. For example, when the words "dog," and "tree" appear in the first sequence and the word "puppy" appears in the second sequence, the pairing ("dog", "puppy") is likely to receive a high affinity scores because the words refer to the same type of animal, whereas the pairing ("tree", "puppy") is likely to receive a low affinity score because they are unrelated concepts. In illustrative embodiments, the set of affinity scores may be determined according to the following equation:

$$A = (E^1)^T E^2 \in \mathbb{R}^{m \times n} \quad (3)$$

where A denotes an affinity matrix containing the set of affinity scores and $X^T$ denotes the transpose of the matrix X.

Coattention layer 310f may further include a pair of summary nodes 332 and 333 that generate summary representations $S^1$ and $S^2$, respectively, based on the affinity scores and the encoded representations $E^1$ and $E^2$. In illustrative embodiments, summary representations $S^1$ and $S^2$ may correspond to real-valued tensors determined according to the following equations:

$$S^1 = E^2 \text{activation}^1(A^T) \in \mathbb{R}^{h \times m} \quad (4)$$

$$S^2 = E^1 \text{activation}^2(A) \in \mathbb{R}^{h \times n} \quad (5)$$

where $\text{activation}^1(X)$ and $\text{activation}^2(X)$ denote respective activation operations over the matrix X (e.g., linear, softmax, sigmoid, tanh, ReLU, ELU, and/or the like).

Coattention layer 310f may further include a context nodes 334 that generates context representation 312f ($C^1$) based on the affinity scores and summary representations $S^2$. In illustrative embodiments, context representation $C^1$ may correspond to a real-valued tensor determined according to the following equation:

$$C^1 = S^2 \text{activation}^3(A^T) \in \mathbb{R}^{h \times m} \quad (6)$$

The activation operations used by context node 334 may or may not be the same as the activation operations used by summary nodes 332 and/or 333.

Returning to FIG. 3A, deep coattention encoder 300 may additionally include an output layer 350 that receives summary representations 312n and/or 314n from the last layer among the plurality of coattention layers 310a-n and generates codependent representation 306. In some embodiments, output layer 350 may include a neural network layer, such as and RNN, feed-forward neural network, and/or the like.

In some embodiments, deep coattention encoder 300 may include a plurality of model parameters learned according to a machine learning process, such as a supervised learning process, a reinforcement learning process, an unsupervised learning process, and/or the like. However, there are various challenges associated with training the model parameters of deep neural network models, such as a model that includes deep coattention encoder 300. For example, one approach to training deep neural network models is to iteratively update the model parameters over a set of training data based on the gradient of a learning objective. However, deep neural networks may train slowly, or not at all, due to the degradation of the gradients (e.g., vanishing and/or exploding gradients) at layers far from the output of the neural network model. Accordingly, one challenge associated with deep coattention encoder 300 is to train model parameters associated with layers and/or sub-layers distant from output layer 350 (e.g., coattention layers 310a and/or 310b).

To address this challenge, deep coattention encoder 300 may include one or more residual connections 360. Residual connections 360 bypass one or more layers (and/or sub-layers and/or nodes) of deep coattention encoder 300, thereby reducing the effective distance between deep layers of the network (e.g., coattention layers 310a and/or 310b) and output layer 350. In general, residual connections 360 may bypass any number of layers, sub-layers, and/or nodes. As depicted in FIG. 3B, the source end of residual connections 360 may correspond to any or each of encoded representations $E^1$ and/or $E^2$, summary representations $S^1$ and/or $S^2$, and/or context representation $C^1$.

In some embodiments, residual connections 360 may be combined with other inputs at a destination layer. For example, residual connections 360 may be concatenated at the destination. Consistent with such embodiments, the size of the inputs to the destination layer may be increased by the use of residual connections 360. To the extent that the increase in input size may be undesirable, various techniques may be applied to reduce the size concatenated input. For example, a pooling layer (e.g., max pooling, average pooling, and/or the like), a feed-forward neural network, and/or the like may be used to the reduce the size of the concatenated input. Additionally or alternately, residual connections 360 and/or other inputs may be combined by techniques other than concatenation, such as summation.

Figure 4:
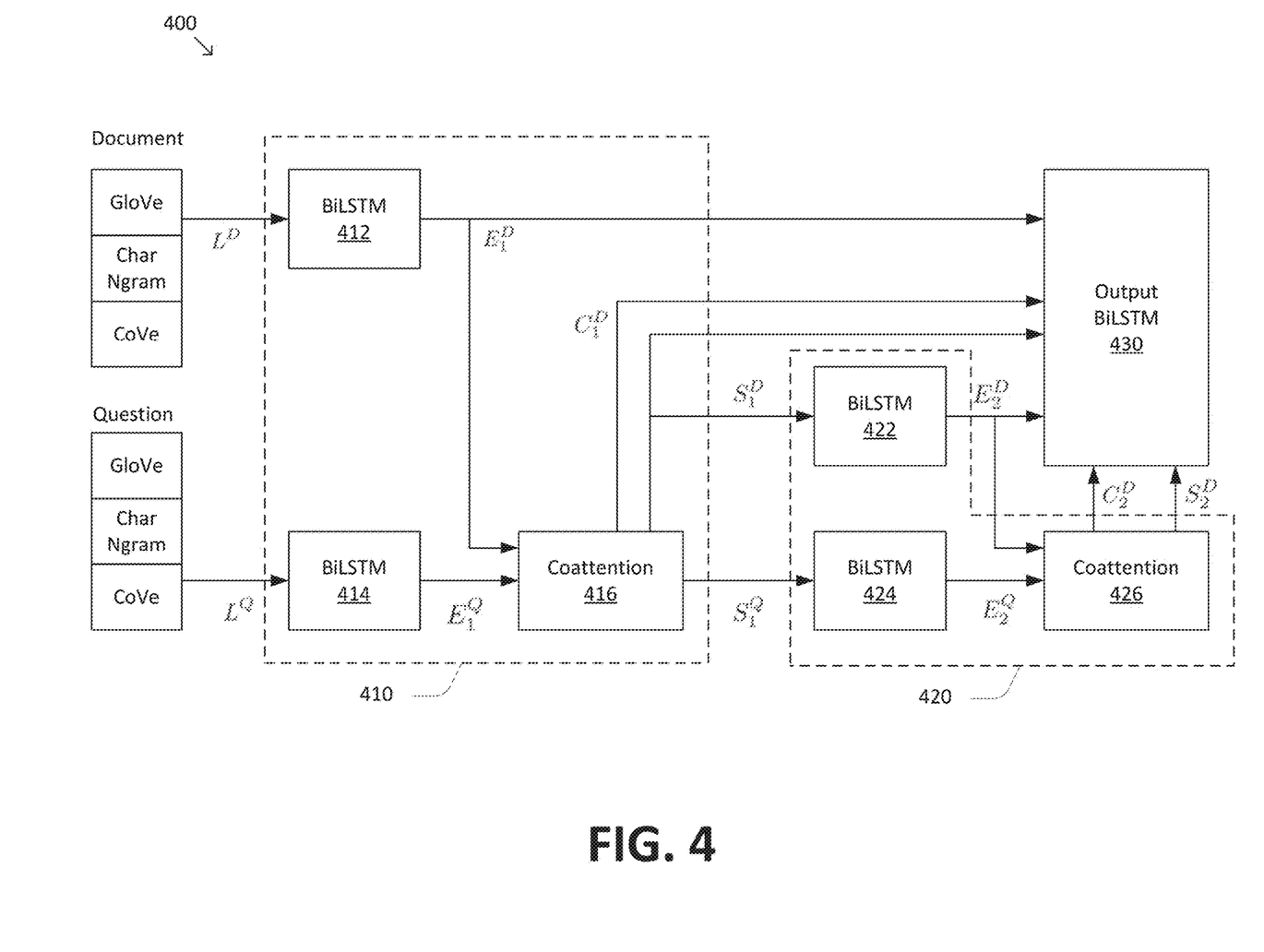
FIG. 4 is a simplified diagram of a deep coattention encoder of a question answering model according to some embodiments.

FIG. 4 is a simplified diagram of a deep coattention encoder 400 of a QA model according to some embodiments. In some embodiments consistent with FIGS. 1-3B, deep coattention encoder 400 may be used to implement deep coattention encoder 300. Deep coattention encoder 400 receives first sequence corresponding to a document of m words and a second sequence corresponding to a question of n words. The document and question are processed by respective input encoders, which generally correspond to input stages 212 and/or 214. As depicted in FIG. 4, the input encoders generate input representation of the document $L^D$ and an input representation of a question $L^Q$ according to the following equations:

$$L^D = \text{concat}(emb_{GloVe}(w^D), emb_{char}(w^D), emb_{coVe}(w^D)) \in \mathbb{R}^{m \times e} \quad (7)$$

$$L^Q = \text{concat}(emb_{GloVe}(w^Q), emb_{char}(w^Q), emb_{coVe}(w^Q)) \in \mathbb{R}^{n \times e} \quad (8)$$

where $w^D = [w_1^D, w_2^D \ldots w_m^D]$ denotes the set of words in the document, $w^Q = [w_1^Q, w_2^Q \ldots w_n^Q]$ denotes the set of words in the question, $emb_{GloVe}$ (Iv) denotes the GloVe embeddings of a set of words, $emb_{char}(w)$ denotes the character embeddings of a set of words, $emb_{coVe}(w)$ denotes a context vector embedding of a set of words, concat(A,B,C) denotes a concatenation between matrices A, B, and C along a feature dimension, m denotes the number of words in the document, n denotes the number of words in the question, and e denotes the total number of dimensions of the word embeddings, character embeddings, and context vector embeddings. In some embodiments, the context vector embeddings are generated by a context vector encoder, such as a two-layer BiLSTM encoder, pretrained on a text corpus, such as the WMT machine translation corpus.

Deep coattention encoder 400 includes a first coattention layer 410, which generally corresponds to coattention layer 310a of deep coattention encoder 300. The input representations of the document $L^D$ and the question $L^Q$ are received by respective bi-LSTM encoders 412 and 414 of first coattention layer 410. In some embodiments consistent with FIG. 3B, bi-LSTM encoders 412 and 414 may correspond to encoding sub-layers 322 and 324, respectively. Bi-LSTM encoders 412 and 414 generate encoded representations $E_1^D$ and $E_1^Q$ of the document and the question, respectively, according to the following equations:

$$E_1^D = bi\text{-LSTM}_1(L^D) \in \mathbb{R}^{h \times (m+1)} \quad (9)$$

$$E_1^Q = \tanh(W\, bi\text{-LSTM}_1(L^Q) + b) \in \mathbb{R}^{h \times (n+1)} \quad (10)$$

where h denotes the number of dimensions of the encoded representation, W and b denote weights and biases, respectively, of a feed-forward neural network layer, and tanh(x) denotes the hypertangent activation function. A sentinel word is added to the input representation to prevent deep coattention encoder 400 from focusing on a particular part of the input representation, so the number of words in the encoded representation of the document and question is (m+1) and (n+1), respectively.

The encoded representations $E_1^D$ and $E_1^Q$ of the document and the question are received by a coattention sub-layer 416, which generally corresponds to nodes 331-335 as depicted in FIG. 3B. Based on encoded representations $E_1^D$ and $E_1^Q$, coattention sub-layer 416 determines an affinity matrix A between the document and the question according to the following equation:

$$A = (E_1^D)^T E_1^Q \in \mathbb{R}^{(m+1) \times (n+1)} \quad (11)$$

As discussed previously, the affinity matrix A contains an affinity score for each pair of words in $E_1^D$ and $E_1^Q$.

Based on affinity matrix A, coattention sub-layer 416 determines document an question summary representations $S_1^D$ and $S_1^Q$, respectively, according to the following equations:

$$S_1^D = E_1^Q \text{softmax}(A^T) \in \mathbb{R}^{h \times (m+1)} \quad (12)$$

$$S_1^Q = E_1^D \text{softmax}(A) \in \mathbb{R}^{h \times (n+1)} \quad (13)$$

where softmax(X) denotes the softmax operation over the matrix X that normalizes X column-wise.

Based on affinity matrix A and summary representations $S_1^D$ and $S_1^Q$, coattention sub-layer 416 determines document context representation $C_1^D$ according to the following equation:

$$C_1^D = S_1^Q \text{softmax}(A^T) \in \mathbb{R}^{h \times m} \quad (14)$$

The sentinel word is removed, such that the number of words in the document context representations $C_1^D$ is m rather than m+1. In some embodiments consistent with FIGS. 3A-3B, $C_1^D$ may correspond to context representation 312a.

Deep coattention encoder 400 further includes a second coattention layer 420 that generally corresponds to coattention layers 310b and/or 310n of deep coattention encoder 300. As depicted in FIG. 4, second coattention layer 420 includes bi-LSTM encoders 422 and 424 and a coattention sub-layer 426, which generally operate in a similar manner to bi-LSTM encoders 412 and 414 and coattention sub-layer 416 of first coattention layer 410, as described above. In particular, bi-LSTM encoders 422 and 424 generate encoded representations $E_2^D$ and $E_2^Q$ of the document and the question, respectively. In some embodiments, the size of representations $E_2^D$ and/or $E_2^Q$ may be the same as and/or different from the size of representations $E_1^D$ and/or $E_1^Q$. In illustrative embodiments, the size of representations $E_2^D$ and/or $E_2^Q$ may be double the size of representations $E_1^D$ and/or $E_1^Q$ (e.g., $E_2^D \in \mathbb{R}^{2h \times m}$ and/or $E_2^Q \in \mathbb{R}^{2h \times n}$). Based on encoded representations $E_2^D$ and $E_2^Q$, coattention sub-layer 426 generates and outputs one or more of a summary representation of the document $S_2^D$ and/or a coattention context of the document $C_2^D$.

An output encoder 430 receives the output representations from the preceding layers and generates a codependent representation U of the document according to the following equation:

$$U = bi\text{-LSTM}(\text{concat}(E_1^D; E_2^D; S_1^D; S_2^D; C_1^D; C_2^D)) \in \mathbb{R}^{2h \times n} \quad (17)$$

As indicated above, output encoder 430 receives various representations of the document (e.g., $E_1^D$, $E_2^D$, $S_1^D$, and $C_1^D$) from bi-LSTM encoder 412, coattention sub-layer 416, and BiLSTM encoder 422, in addition to representations of the document from coattention sub-layer 426 (e.g., $S_2^D$, and $C_2^D$). The representations received from earlier layers of deep coattention encoder 400 correspond to residual connections, such as residual connection 360, that bypass one or more layers and/or sub-layers of the network. In general, the use of residual connections may facilitate training of deep coattention encoder 400 by addressing gradient degradation issues.

Figure 5:
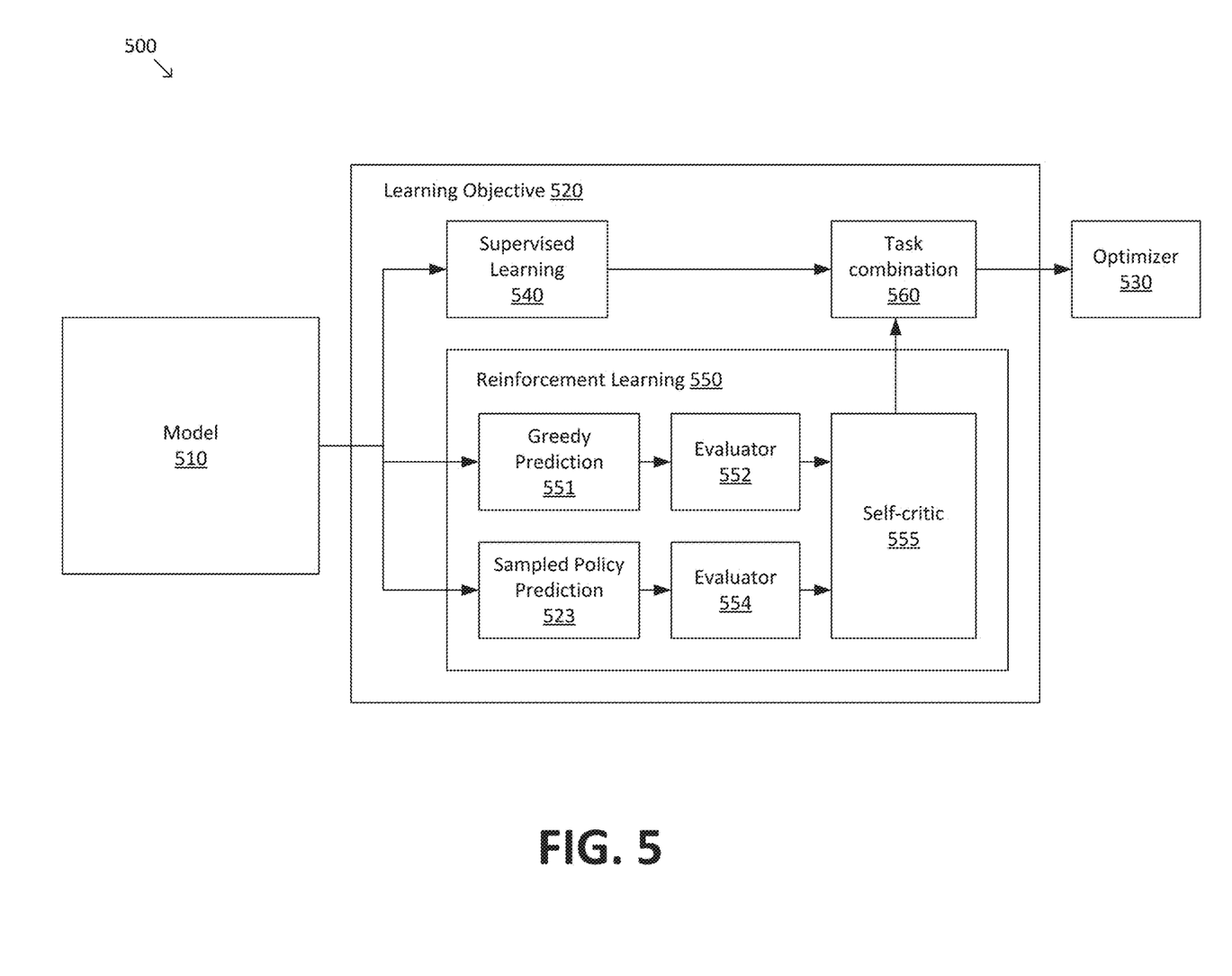
FIG. 5 is a simplified diagram of a training configuration with a mixed learning objective according to some embodiments.

FIG. 5 is a simplified diagram of a training configuration 500 with a mixed learning objective according to some embodiments. As depicted in FIG. 5, training configuration 500 is used to train a model 510. In some embodiments consistent with FIGS. 1-4, model 510 may be used to implement model 200. In some embodiments, training configuration 500 may be used to reduce the amount of time and/or training data used to train model 510. In some embodiments, model 510 may include a deep coattention encoder, such as deep coattention encoders 300 and/or 400. However, it is to be understood that training configuration 500 may be used for training a wide variety of model types, including non-QA models and/or models without deep coattention encoders.

According to some embodiments, training configuration 500 may be used to train a plurality of model parameters of model 510. During training, a large number of training examples (e.g., pairs of input sequences for dual sequence inference applications) are provided to model 510. The inferences generated by model 510 are compared to a ground truth answers for each of the examples using a learning objective 520, which determines a loss and/or reward associated with a given inference based on the ground truth answer.

The output of learning objective 520 (e.g., the loss and/or reward) is provided to an optimizer 530 to update the model parameters of model 510. For example, optimizer 530 may determine the gradient of the objective with respect to the model parameters and adjust the model parameters using backpropagation. In some embodiments, optimizer 530 may include a gradient descent optimizer (e.g., stochastic gradient descent (SGD) optimizer), an ADAM optimizer, an Adagrad optimizer, an RMSprop optimizer, and/or the like. Various parameters may be supplied to optimizer 530 (e.g., a learning rate, a decay parameter, and/or the like) depending on the type of optimizer used.

In some embodiments, model 510 may iteratively generate a series of inferences for a given pair of input sequences. For example, model 510 may include a coattention encoder, such as deep coattention encoder 300, that generates a codependent representation of the pair of input sequences and a dynamic decoder that iteratively generates inferences based on the codependent representation until the inferences converge (e.g., when the inferences change by less than a threshold amount during consecutive iterations).

In some embodiments, learning objective 520 may determine the loss and/or reward associated with a given series of inferences generated by model 510 using a supervised learning objective 540. In some embodiments, supervised learning objective 540 may determine loss and/or reward by evaluating a differentiable objective function, such as the cross-entropy loss function. In QA applications, where each inference corresponds to a span in a document defined by a start position and an end position, the cross-entropy loss may be defined as follows:

$$\text{loss}_{ce}(\Theta) = -\Sigma_t[\log p_t^{start}(s|s_{t-1}, e_{t-1}; \Theta) + \log p_t^{end}(e|s_{t-1}, e_{t-1}; \Theta)] \quad (18)$$

where $\text{loss}_{ce}(\Theta)$ is the cross-entropy loss for a given set of model parameters $\Theta$; $p_t^{start} \in \mathbb{R}^m$ and $p_t^{end} \in \mathbb{R}^m$ are the distributions of the start and end positions, respectively, estimated by the dynamic decoder at decoder time step t; s and e are the ground truth start and end positions, respectively; and $s_{t-1}$ and $e_{t-1}$ are the estimates of the start and end positions at the previous decoder time step. Because the cross-entropy loss function is differentiable with respect to the model parameters, it is generally straightforward for optimizer 530 to determine the gradient and update the parameters at each training step by back propagation.

Although supervised learning objective 540 may provide a useful starting point for assessing the accuracy of the inferences generated by model 510, this approach may on occasion produce undesirable results. For example, supervised learning objective 540 may punish and/or reward certain inferences in a non-intuitive or unwarranted manner. In QA applications, supervised learning objective 540 may correspond to the "exact match" accuracy metric discussed previously. In this regard, supervised learning objective 540 may determine loss and/or rewards in a binary manner, in which inferences are regarded as being correct when they exactly correspond to the ground truth answer and incorrect otherwise. However, the exact match metric does not provide a notion of being "close" to the correct answer; each inference is regarded as either right or wrong, with no in-between.

Other evaluation metrics, such as the F1 score, are non-binary. In general, non-binary evaluation metrics account for the fact that some inferences may be regarded as being at least partially correct, even if they do not exactly match the ground truth answer. For example, the F1 score partially rewards inferences that overlap with, but do not exactly match, the ground truth answer. In this regard, non-binary evaluation metrics, such as the F1 score, may provide a more nuanced comparison between the inferences and the ground truth than binary evaluation metrics, such as the exact match metric.

Accordingly, learning objective 520 may include a reinforcement learning objective 550 based on a non-binary evaluation metric, such as the F1 score. In some embodiments, reinforcement learning objective 550 may use the non-binary evaluation metric to define a loss and/or reward function for a reinforcement learning process. For example, reinforcement learning objective 550 may evaluate to the negative of the expected reward over trajectories T given a set of model parameters, where each of the trajectories T corresponds to a sequence of start and end positions at each decoder time step. In illustrative embodiments, reinforcement learning objective 550 may be evaluated as follows:

$$\text{baseline} = F_1(\text{ans}(s_T, e_T), \text{ans}(s, e)) \quad (19)$$

$$R = F_1(\text{ans}(\hat{s}_T, \hat{e}_T), \text{ans}(s, e)) - \text{baseline} \quad (20)$$

$$\text{loss}_{rl}(\Theta) = -\mathbb{E}_{\hat{\tau} \sim p_\tau}[R] \quad (21)$$

where $F_1$ denotes the F1 word overlap scoring function; baseline denotes the baseline F1 score; ans(x, y) denotes the answer span retrieved from the document based on a given start position x and end position y; s and e are the ground truth start and end positions, respectively; $s_T$ and $e_T$ are the baseline start and end positions, respectively, at the last decoder time step T; R is the reinforcement learning reward function; $\hat{s}_T$ and $\hat{e}_T$ are the start an end positions, respectively, of the sampled trajectory $\hat{\tau}$ at the last decoder time step T; $\text{loss}_{rl}(\Theta)$ is the reinforcement learning loss for a given set of model parameters $\Theta$; and $p_\tau$ is the probability distribution of trajectories $\tau$.

In some embodiments, reinforcement learning objective 550 may include a greedy prediction module 551 that determines $s_T$ and $e_T$ (the start and end positions of the baseline, as defined in Equation 19) in a greedy fashion without a teacher forcing on the start position. Reinforcement learning objective 550 may further include a first evaluator 552 that evaluates Equation 19 to determine the baseline F1 score based on $s_T$ and $e_T$. In some embodiments, reinforcement learning objective 550 may include a sampled policy prediction module 523 that determines $\hat{s}_T$ and $\hat{e}_T$ and a second evaluator 554 that determines the policy F1 score based on $\hat{s}_T$ and $\hat{e}_T$. The policy F1 score corresponds to the first term, $F_1(\text{ans}(\hat{s}_T, \hat{e}_T), \text{ans}(s,e))$, of Equation 20. Reinforcement learning objective 550 further includes a self-critic module 555 that subtracts the baseline F1 score from the policy F1 score to obtain the reinforcement learning loss defined by Equation 21.

In some embodiments, learning objective 520 may include a task combination module 560 to combine supervised learning objective 540 and reinforcement learning objective 550. In some embodiments, combining supervised learning objective 540 and reinforcement learning objective 550 (as opposed to using one or the other) may accelerate the training of model 510. More specifically, the use of supervised learning objective 540 may accelerate policy learning according to reinforcement learning objective 550 by pruning the space of candidate trajectories. For example, in QA applications, the use of reinforcement learning objective 550 (without supervised learning objective 540) may result in slow training due to the large space of potential answers, documents, and/or questions.

In illustrative embodiments, learning objective 520 may include a task combination module 560 that combines supervised learning objective 540 and reinforcement learning objective 550 using homoscedastic uncertainty as task-dependent weightings according to the following equation:

$$\text{loss} = \frac{1}{2\sigma_{ce}^2}\text{loss}_{ce}(\Theta) + \frac{1}{2\sigma_{rl}^2}\text{loss}_{rl}(\Theta) + \log(\sigma_{ce}^2) + \log(\sigma_{rl}^2) \quad (22)$$

where $\sigma_{ce}$ and $\sigma_{rl}$ are learnable parameters.

Unlike the cross-entropy loss function, the reinforcement learning loss function used by reinforcement learning objective 550 may not be differentiable. Accordingly, optimizer 530 may use estimation techniques to determine the gradient of associated with reinforcement learning objective 550. According to some embodiments, the gradient associated with reinforcement learning objective 550 may be approximated using a single Monte-Carlo sample $\tau$ drawn from the probability distribution $p_\tau$ according to the following equation:

$$\nabla_\Theta \text{loss}_{rl}(\Theta) \approx -R\nabla_\Theta(\Sigma_t^T(\log p_t^{start}(\hat{s}_t;\Theta) + \log p_t^{end}(\hat{e}_T;\Theta))) \quad (23)$$

where all terms are as previously defined. Based on the approximated gradient of reinforcement learning objective 550 with respect to the model parameters $\Theta$, optimizer 530 may proceed to update the parameters of model 510 based on the combination of supervised learning objective 540 and reinforcement learning objective 550.

Figure 6:
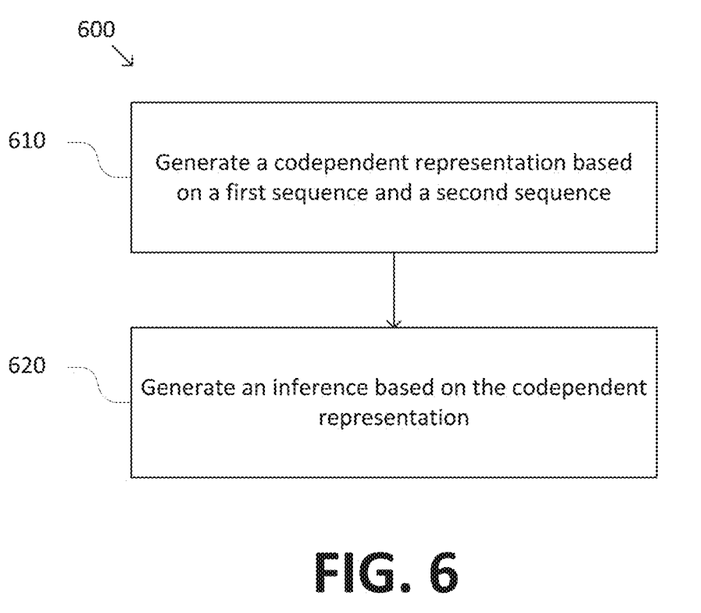
FIG. 6 is a simplified diagram of a method for dual sequence inference according to some embodiments.

FIG. 6 is a simplified diagram of a method 600 for dual sequence inference according to some embodiments. According to some embodiments consistent with FIGS. 1-5, method 600 may be performed using a processor, such as processor 120. In some embodiments, method 600 may be performed by evaluating a neural network model, such as model 140 and/or 200. In some embodiments, the neural network model may include a plurality of model parameters learned according to a machine learning process.

At a process 610, a codependent representation is generated based on a first sequence and a second sequence. In some embodiments, the codependent representation may be generated by an encoder stage of the neural network model. In illustrative embodiments, the encoder stage may be implemented using a deep coattention encoder, such as deep coattention encoder 300 and/or 400. In some embodiments the first and second sequence may correspond to text sequences, audio sequences, image sequences (e.g., video), and/or the like. In QA applications, the first sequence may correspond to a document and the second sequence may correspond to a question.

At a process 620, an inference is generated based on the codependent representation. In some embodiments, the inference may be generated using a decoder stage of the model, such as decoder stage 230. In some embodiments, the decoder model may include a dynamic decoder model that iteratively generates a series of inferences based on the codependent representation. In QA applications, the inference may identify a span of text in the document that answers the question.

Figure 7:
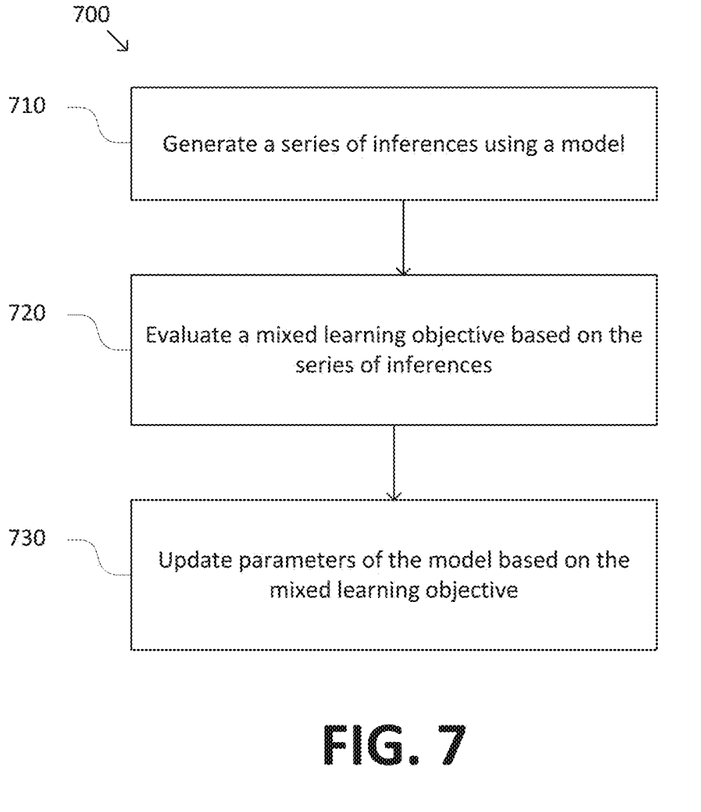
FIG. 7 is a simplified diagram of a method for training a neural network model using a mixed learning objective according to some embodiments.

FIG. 7 is a simplified diagram of a method 700 for training a neural network model using a mixed learning objective according to some embodiments. According to some embodiments consistent with FIGS. 1-6, method 700 may be used to train a neural network model, such as model 140 and/or 200. During training, the model may be configured in a training configuration, such as training configuration 500. In some examples, method 700 may be performed iteratively over a large number of training examples to gradually train the neural network model.

At a process 710, a series of inferences is generated using the neural network model. In some embodiments, the series of inferences may be generated based on a training example that includes a first training sequence and a second training sequence. In some embodiments, the series of inferences may be generated according to method 600, in which an encoder stage of the neural network model generates a codependent representation based on the first and second training sequences. Consistent with such embodiments, the series of inferences may correspond to a series of inferences generated by a dynamic decoder based on the codependent representation.

At a process 720, a mixed learning objective is evaluated based on the series of inferences. In some embodiments, the mixed learning objective may correspond to learning objective 520. Consistent with such embodiments, the mixed learning objective may include a supervised learning objective, such as supervised learning objective 540, and a reinforcement learning objective, such as reinforcement learning objective 550. Whereas the supervised learning objective may determine a loss and/or reward independently at each decoder step (e.g., independently at each of the series of inferences), the reinforcement learning objective may determine an expected loss and/or reward over an entire trajectory (e.g., collectively over the series of inferences). In some examples, the reinforcement learning objective may determine the expected loss and/or reward using a non-binary evaluation metric, such as the F1 evaluation metric.

At a process 730, the parameters of the neural network model are updated based on the mixed learning objective. In some embodiments, the model parameters may be updated using an optimizer, such as optimizer 530. In some embodiments, the parameters may be updated by determining a gradient of the mixed learning objective with respect to the model parameters and updating the parameters based on the gradient. The gradient of differentiable components of the mixed learning objective, such as the supervised learning objective component, may be determined by back propagation. To the extent that the component of the mixed learning objective associated with the reinforcement learning objective may not be differentiable, the gradient may be estimated, e.g., using Monte Carlo techniques.

FIGS. 8A-8D are simplified diagrams of an experimental evaluation of a QA model according to some embodiments. The QA model being evaluated includes a deep coattention encoder, configured as depicted in FIG. 4, and is trained on the Stanford Question Answering Dataset (SQuAD) using a mixed learning objective, with a training configuration as depicted in FIG. 5.

Figure 8A:
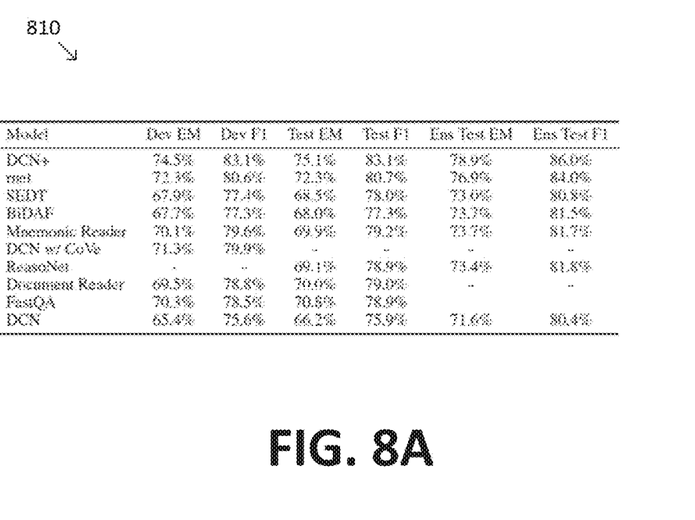
FIGS. 8A-8D are simplified diagrams of an experimental evaluation of a question answering model according to some embodiments.

FIG. 8A depicts a table 810 that compares the accuracy of a QA model that includes the deep coattention encoder (top row) to the accuracy of QA models that do not include the deep coattention encoder (other rows). The training and testing is performed on SQuAD. As indicated in the table, the QA model that includes the deep coattention encoder achieves the highest accuracy across all metrics, including 75.1% exact match accuracy (Test EM), 83.1% F1 score accuracy (Test F1), 78.9% ensemble exact match accuracy (Ens Test F1), and 86.0% ensemble F1 accuracy (Ens Test F1).

Figure 8B:
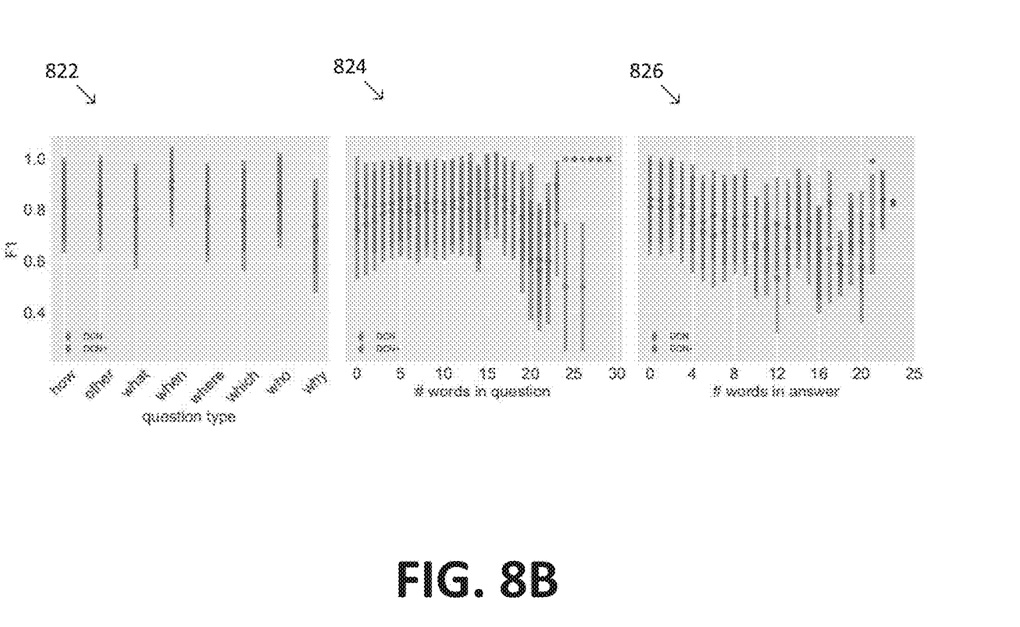

FIG. 8B depicts a series of plots 822, 824, and 826 that compare the accuracy of a QA model that includes a deep coattention encoder to a model that includes a single-layer coattention encoder. In particular, plot 822 plots F1 score accuracy as a function of question type (e.g., "who," "what," "where," "when," "why," "how," "which," and "other"). As indicated, the QA model that includes the deep coattention encoder outperforms the model that includes the single-layer coattention encoder for every question type. Plot 824 plots F1 score accuracy as a function of the number of words in the question. As indicated, the QA model that includes the deep coattention encoder outperforms the QA model that includes the single-layer coattention encoder for almost every length of question. Plot 826 plots F1 score accuracy as a function of the number of words in the answer. As indicated, the QA model that includes the deep coattention encoder outperforms the QA model that includes the single-layer coattention encoder for almost every length of answer.

Figure 8C:
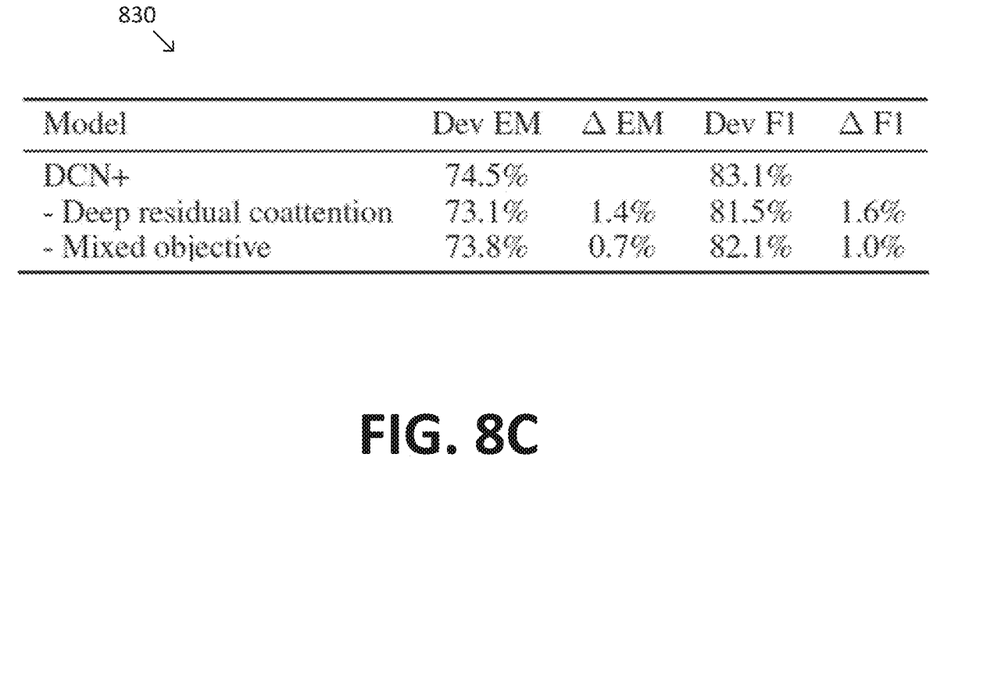

FIG. 8C depicts a table 830 with results of an ablation study performed on the QA model. The ablation study isolates the contribution of various features (e.g., a deep coattention encoder, as depicted in FIG. 4, and/or a training configuration with a mixed learning objective, as depicted in FIG. 5) to the overall improvement in accuracy of the QA model. The top row corresponds to a QA model with a deep coattention encoder trained with a mixed learning objective. The second row corresponds to a QA model with a single-layer coattention encoder trained with a mixed learning objective. As indicated, the deep coattention layer is responsible for a 1.4% improvement in exact match accuracy and a 1.6% improvement in F1 score accuracy. Meanwhile, the mixed learning objective is responsible for an 0.7% improvement in exact match accuracy and a 1.0% improvement in F1 score accuracy.

Figure 8D:
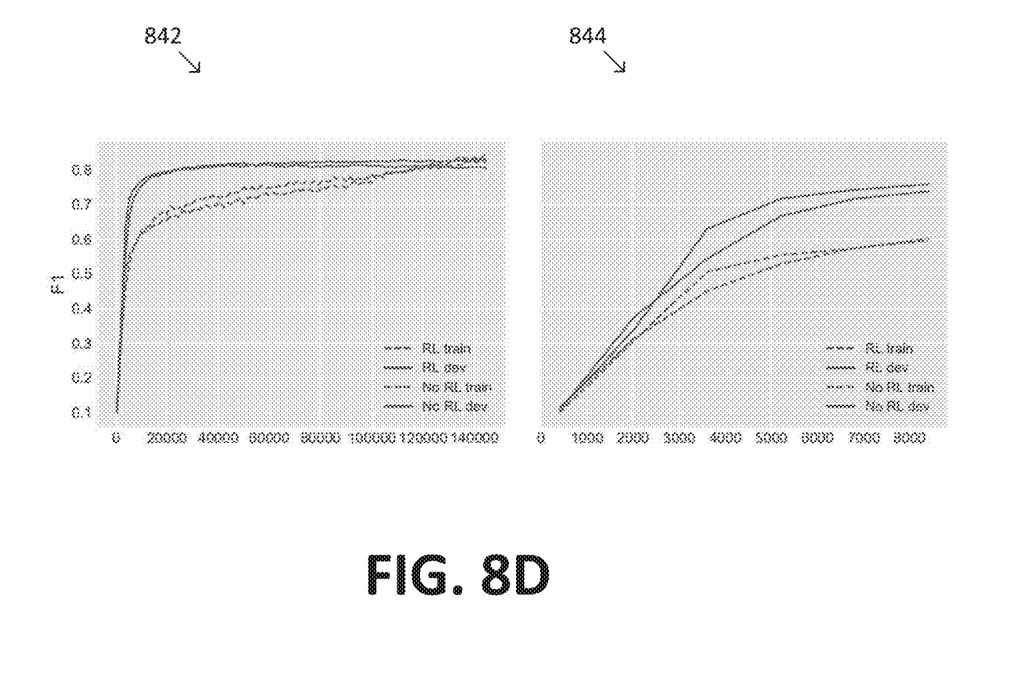

FIG. 8D depicts a pair of plots 842 and 844 that compare training curves for a QA model with a deep coattention encoder with a mixed learning objective (solid line) and without a mixed learning objective (dotted line). Plot 842 displays the entire training curves, and plot 844 displays a close-up view of the training curves at early training stages. As indicated, the use of a mixed learning objective during training significantly increases the training rate of the QA model compared to training without the mixed learning objective.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A computer-implemented method for generating an inference using a neural network model, comprising:
   generating a codependent representation based on a first input representation of a first sequence and a second input representation of a second sequence using an encoder of the neural network model, the encoder comprising a plurality of coattention layers, arranged sequentially, wherein the generating further comprises:
receiving, at a first coattention layer in the plurality of coattention layers the first input representation and the second input representation, and generating a pair of summary representations;
receiving, at remaining coattention layers of the plurality of coattention layers, the remaining coattention layers arranged sequentially after the first coattention layer, a pair of layer input representations, the pair of layer input representations corresponding to a pair of summary representations generated by a preceding layer among the plurality of coattention layers, and generating pairs of summary representations; and
receiving, at an output layer, a pair of summary representations from a last layer from the remaining coattention layers and generating the codependent representation; and
generating the inference based on the codependent representation using a decoder of the neural network model.

2. The computer-implemented method of claim 1, wherein the first sequence corresponds to a document, the second sequence corresponds to a question, and the inference corresponds to a span of text in the document that answers the question.

3. The computer-implemented method of claim 1, wherein the encoder includes at least one residual connection that is an output of one of coattention layers and that bypasses one or more subsequent coattention layers of the plurality of coattention layers.

4. The computer-implemented method of claim 1, wherein a coattention layer of the plurality of coattention layers determines a set of affinity scores corresponding to a pair of items in the pair of layer input representations.

5. The computer-implemented method of claim 4, wherein a coattention layer of the plurality of coattention layers determines one pair of the summary representations based on the pair of layer input representations and the set of affinity scores.

6. The computer-implemented method of claim 5, wherein the coattention layer of the plurality of coattention layers determines one or more context representations based on the set of the affinity scores and the one pair summary representations.

7. The computer-implemented method of claim 1, further comprising:
generating a series of training inferences using the neural network model;
evaluating a mixed learning objective based on the series of training inferences; and
updating parameters of the encoder based on the mixed learning objective.

8. The computer-implemented method of claim 7, wherein the mixed learning objective includes a combination of a supervised learning objective and a reinforcement learning objective, where the reinforcement learning objective is based on a non-binary evaluation metric.

9. The computer-implemented method of claim 8, wherein the non-binary evaluation metric corresponds to an F1 score.

10. The computer-implemented method of claim 8, wherein the supervised learning objective is based on a cross-entropy loss function.

11. The computer-implemented method of claim 8, wherein updating the parameters of the encoder includes approximating a gradient associated with the reinforcement learning objective using a Monte Carlo sample.

12. The computer-implemented method of claim 1, wherein the output layer includes a bidirectional long short-term memory layer.

13. A system for generating an inference, comprising:
an encoder configured to generate, using a processor, a codependent representation based on a first input representation and a second input representation, the first input representation based on a first sequence and the second input representation based on a second sequence, the encoder comprising:
a first coattention layer in a plurality of coattention layers configured to generate a first pair of summary representations based on the first input representation and the second input representation;
a plurality of remaining coattention layers arranged sequentially after the first coattention layer, and configured to receive a pair of layer input representations, the pair of layer input representations corresponding to the pair of summary representations generated by a preceding layer among the plurality of coattention layers, and generating pairs of summary representations; and
an output layer configured to receive a pair of summary representations generated by a last layer among the plurality of remaining coattention layers and generate the codependent representation; and
a decoder configured to generate, using the processor, the inference based on the codependent representation.

14. The system of claim 13, wherein the encoder includes at least one residual connection that is an output of one of coattention layers and that bypasses one or more subsequent coattention layers of the plurality of coattention layers.

15. The system of claim 13, wherein a coattention layer of the plurality of coattention layers includes an affinity node that determines a set of affinity scores based on the pair of layer input representations.

16. The system of claim 15, wherein a coattention layer of the plurality of coattention layers includes a pair of summary nodes that determines the pair of summary representation based on the pair of layer input representations and the set of affinity scores.

17. The system of claim 16, wherein a coattention layer of the plurality of coattention layers includes a context node that determines a context representation based on the set of the affinity scores and at least one of the pair of summary representations.

18. The system of claim 13, wherein the output layer includes a bidirectional long short-term memory layer.

19. A non-transitory machine-readable medium having stored thereon a question answering model, the question answering model comprising:
a deep coattention encoder of the question answering model comprising:
a first encoding sub-layer that receives an input representation of a document and generates a first encoded representation of the document;
a second encoding sub-layer that receives an input representation of a question and generates a first encoded representation of the question;
a first affinity node that receives the first encoded representation of the document and the first encoded representation of the question and generates a first set of affinity scores;

a first summary node that receives the first encoded representation of the question and the first set of affinity scores and generates a first summary representation of the document;
a second summary node that receives the first encoded representation of the document and the first set of affinity scores and generates a first summary representation of the question;
a third encoding sub-layer that receives the first summary representation of the document and generates a second encoded representation of the document;
a fourth encoding sub-layer that receives the first summary representation of the question and generates a second encoded representation of the question;
a second affinity node that receives the second encoded representation of the document and the second encoded representation of the question and generates a second set of affinity scores;
a third summary node that receives the second encoded representation of the question and the first set of affinity scores and generates a second summary representation of the document; and
an output layer that receives the second summary representation of the document and generates a codependent representation; and
a dynamic decoder of the question answering model that receives the codependent representation and predicts an answer span within the document.

20. The non-transitory machine-readable medium of claim 19, wherein the output layer further receives one or more of the first encoded representation of the document, the first summary representation of the document, or the second encoded representation of the document via one or more residual connections of the deep coattention encoder.

\* \* \* \* \*